Sept. 26, 1933.  J. KLETSKY  1,928,155

MULTIFLEX AUTOMOBILE SEAT

Filed Nov. 17, 1932

INVENTOR,
Julius Kletsky,
BY
Harry W. Bowen.
ATTORNEY.

Patented Sept. 26, 1933

1,928,155

UNITED STATES PATENT OFFICE 1,928,155

MULTIFLEX AUTOMOBILE SEAT

Julius Kletsky, Springfield, Mass.

Application November 17, 1932
Serial No. 643,085

5 Claims. (Cl. 155—179)

This invention relates to improvements in multiflex automobile seats.

An object of the invention is to provide a flexible and elastic seat for automobiles and one that will automatically yield in both longitudinal and transverse directions, when in use.

Heretofore, automobile seats have been constructed of solid pieces of sponge rubber that extend completely over the area of the seat. It has been found, from actual practice, that automobile seats, when constructed of solid pieces of sponge rubber do not readily respond to the unevenness of the roadway, or in other words, the sponge rubber assumes a compressed condition that does not have any upward movement to speak of, whereby the seat is uncomfortable and necessarily hard riding.

My invention, broadly, comprises a suitable casing, or framework, constructed of metal, wood, or any suitable material. Located within this framework, and extending in both longitudinal and transverse directions, are a series of sponge rubber strips, or straps, of suitable length and size that are secured at their ends only to the framework of the seat, or in other words, these strips of elastic material are suspended, for free up and downward movements, within the framework. The number of the longitudinal and transverse strips necessarily depends upon the height of the framework and the strength desired for any particular use, for which the seat is to be designed. In the lower portion of the casing, there are located a plurality of shock-absorbing arch-shaped members of sponge rubber that are substantially semi-circular in extent, and located in the center line of the casing. These units, or shock-absorbing arches are designed to take up any excessive downward flexing of the suspended elastic strips, under severe conditions. Located under the arches, is an inflatable member which may be varied, as to the air pressure, for restoring the normal condition of the supporting arches.

Referring to the drawing:—

Referring to the drawing in detail:—

Figure 1:
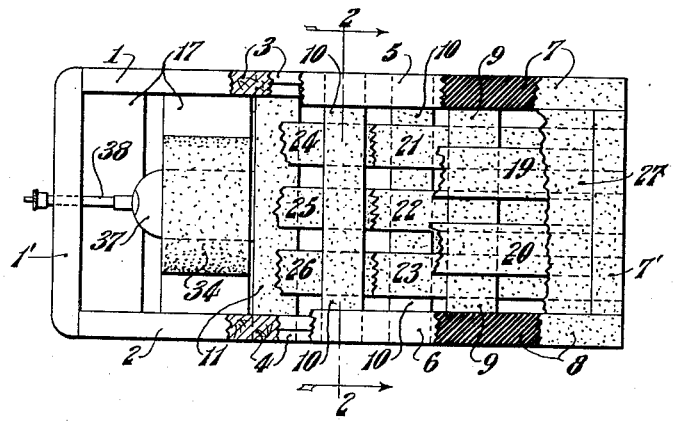
Fig. 1 is a plan view, partially in section, showing portions of the framework broken away and the longitudinal and transverse elastic strips of sponge rubber broken away for illustrating the arrangement of the same.

1 and 2 designate the side members of the supporting casing that are composed of wood, or other suitable material. 3 and 4 are strips of wood located above the side pieces 1 and 2. 5 and 6 and 7 and 8 are strips of sponge rubber for providing yieldable edges. Transversely arranged within the frame members are the strips of sponge rubber 9, 10 and 11. The ends of these strips are fixedly secured between the side pieces of the framework. The strips 9, of sponge rubber, are permanently secured to the side strips 7 and 8 of sponge rubber, by means of the rubber cement, indicated at 12. The transverse strips 10 are pinched at their ends, between the strips 3 and 5 and 4 and 6, the compression being indicated at 13. The upper surfaces of the ends of these strips are cemented to the strips 5 and 6 with the rubber cement, indicated at 14. The transverse strips 11 are pinched between the strips 1 and 3 and 2 and 4 of wood, as indicated at 15, and are held, or secured, in place by the nails 16. 17 indicates the bottom plate, or member, of the framework that is secured to the side strips 1 and 2, and end strips 1' and 2' with the nails 18, or other suitable devices.

Extending longitudinally of the framework are a series of elastic strips of sponge rubber, indicated at 19, 20, 21, 22, 23, 24, 25 and 26. The strips 19 and 20 are permanently secured to the rubber top member 27, as indicated by the rubber cement 28. These strips are also permanently secured on their lower surfaces to the transverse strip 9 by means of the rubber cement 29.

The longitudinal strips 21, 22, and 23 are permanently secured to the transverse strips 9 and 10, at their upper and lower surfaces, by means of the rubber cement 30 and 31. The longitudinal strips 24, 25, and 26 are permanently secured, at their lower surfaces only, to the transverse strips 11 by means of the rubber cement, indicated at 32.

Figure 2:
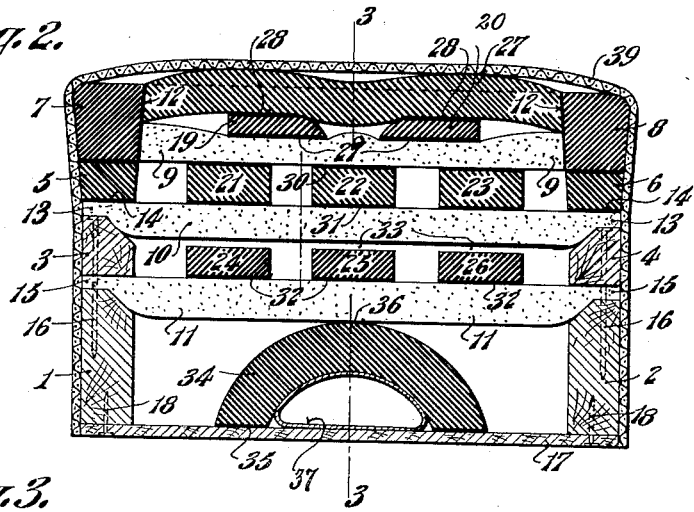
Fig. 2 is a transverse sectional view on the line 2—2 of Fig. 1, showing the elastic members suspended at their ends, also the supporting arches and the inflatable member within the arches.
Figure 3:
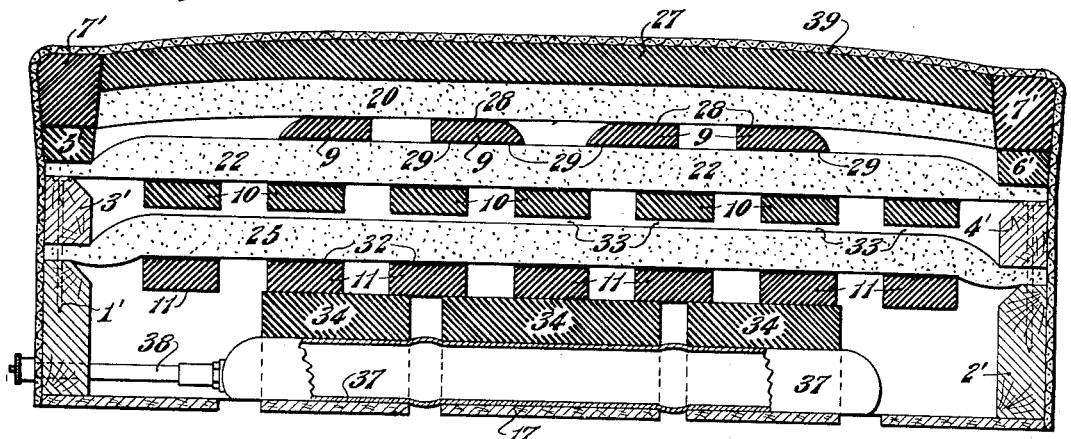
Fig. 3 is a longitudinal sectional view on the line 3—3 of Fig. 2, showing the longitudinal elastic strips supported at their ends, also, the inflatable member in the arch supports.

It should be particularly observed that the longitudinal strips 24, 25 and 26 are not secured to the transverse strips 10, as indicated by the spaces 33. This construction, therefore, permits the top member 27, longitudinal strips 19 and 20, transverse strips 9 and 10, and the longitudinal strips 21, 22 and 23 to move freely upward and downward, as a unit, when in use. The suspended construction permits elasticity also, both in longitudinal and transverse directions of the framework. The longitudinal strips 24, 25, and 26, which are permanently secured to the transverse strips 11, may move freely as a unit upward and downward, since they are suspended at the end portions 15. 34 indicates a plurality of arch-shaped members of sponge rubber, one of which is shown in section in Fig. 2. These members are located between the transverse strips 11 and the bottom plate 17, to which they are secured with the rubber cement 35, or otherwise. Their curved upper surfaces are in contact with the strips 11, indicated at 36. 37 indicates an inflatable member, which is located in the arch-shaped space on the under side of the members 34. The purpose of this inflatable member is to compensate for any loss of elasticity of the members 34, as the inflating tube 38 permits greater or less air pressure to be maintained in this member. It should be stated that the longitudinal members 19, 20, 21, 22, 23, 24, 25 and 26 are fixedly secured to the end members 7', 5', 6', 3' and 4'. A suitable upholstered covering is indicated at 39.

It will be seen, from this description, that I have produced a multiplex automobile seat, which involves the principle of supporting the interior seat construction at its ends, or in other words, the longitudinal and transverse members of sponge rubber are suspended, or supported, only from their ends on the casing, thus permitting a free upward and downward movement of the cushion, when in use.

What I claim is:—

1. A multiflex automobile seat comprising a suitable framework having side, end and bottom portions, a plurality of transverse and longitudinal elastic members suspended at their ends on the framework, means permanently securing a plurality of the transverse and longitudinal elastic members together in the upper portion of the framework and also permanently securing a plurality of the transverse and longitudinal members in the lower part of the framework together, but with a space between said upper and lower members being left free and unobstructed whereby the two sets of said members may have free upward and downward movement.

2. A multiflex automobile seat comprising a suitable framework having side, end and bottom portions, a plurality of transverse and longitudinal elastic members suspended at their ends on the framework, means permanently securing a plurality of the transverse and longitudinal elastic members together in the upper portion of the framework and also permanently securing a plurality of the transverse and longitudinal members in the lower part of the framework together, but with a space between said upper and lower members being left free and unobstructed whereby the two sets of said members may have free upward and downward movement, and a plurality of arch-shaped members of elastic material located between the lowermost series of said elastic and transverse members and the bottom plate of the framework.

3. A seat construction for the purpose described comprising a supporting frame, the lower sides and end portions of the frame being of inelastic material and the upper sides and end portions being of elastic material, a plurality of elastic members secured at their ends only to the said portions of the supporting frame for permitting free upward and downward movement within the supporting frame, said elastic members crossing each other and being secured to each other at their crossing points, and means providing a pneumatic support between the bottom of the supporting frame and the said elastic members.

4. A cushion construction for the purpose described comprising a supporting frame, elastic members attached to the frame at their ends only and arranged parallel to the sides and ends of the said frame, means securing the elastic members together where they cross each other, a plurality of arch-shaped elastic members located below the said members for receiving abnormal shocks as described.

5. A cushion construction for the purpose described comprising a supporting frame, elastic members attached to the frame at their ends only and arranged parallel to the sides and ends of the said frame, means securing the elastic members together where they cross each other, a plurality of arch-shaped elastic members located below the said members for receiving abnormal shocks as described, and means for varying the compression effect of the arch-shaped members.

JULIUS KLETSKY.